United States Patent [19]

Sawyer et al.

[11] Patent Number: 5,569,065
[45] Date of Patent: Oct. 29, 1996

[54] SHRIMP DEVEINING MACHINE HAVING PRECISION CUTTING CONTROL

[75] Inventors: Derrell Sawyer, Caddo Mills; Donald R. Morris, Greenville, both of Tex.

[73] Assignee: Prawnto Shrimp Machine Company of Texas, Inc., Caddo Mills, Tex.

[21] Appl. No.: 512,845

[22] Filed: Aug. 9, 1995

[51] Int. Cl.$^6$ ................................................ A22C 25/02
[52] U.S. Cl. ............................................ 452/3; 452/5
[58] Field of Search .................................. 452/3, 2, 5

[56] References Cited

U.S. PATENT DOCUMENTS

| | | | |
|---|---|---|---|
| 2,702,921 | 3/1955 | Pinney | 452/3 |
| 4,843,683 | 7/1989 | Grammer | 452/5 |
| 5,290,199 | 3/1994 | Morris | 452/3 |

Primary Examiner—Willis Little
Attorney, Agent, or Firm—Smith & Catlett, P.C.

[57] ABSTRACT

A shrimp deveining machine for cutting and deveining shrimp comprises a motorized driving mechanism inside a housing and a cutting mechanism outside the housing. An upper pair of rotating flexible disks grasps the top side of shrimp bodies and propel them past a cutting disk which slices the sand vein from the back of the shrimp. A lower pair of flexible disks is mounted on an adjusting shaft which may be positioned to adjust the depth of cut on the shrimp. The lower pair of flexible disks grasps the bottom side of the shrimp bodies and dynamically adjusts the position of the shrimp bodies in relation to the cutting disk, thereby achieving a more uniform depth of cut on shrimp of different sizes. The flexible disks also prevent longitudinal rotation of the shrimp bodies, and enable the deveining machine to make a butterfly cut on the shrimp bodies.

18 Claims, 4 Drawing Sheets

SHRIMP DEVEINING MACHINE HAVING PRECISION CUTTING CONTROL

BACKGROUND OF THE INVENTION

1. Field of the Invention

This invention is related to a machine for deveining shrimp, and, more specifically, to an apparatus for cutting the sand vein from shrimp with improved cutting control and capability to devein shrimp of different sizes.

2. Description of Related Art

Shrimp cutting and deveining machines have existed for a number of years. An early version is shown in U.S. Pat. No. 2,702,921 to Pinney. FIG. 1 is a frontal, right-side perspective view of the shrimp cutting machine in Pinney. A shrimp is fed manually into the machine 1 which holds the shrimp in a stretched out position while it is being cut lengthwise down the center of the back and subsequently cut a second time on each side of the center cut. The shrimp is placed on the top 2 of the machine with its back side up, and is then pushed head-first through guides 3 and 4 until it comes in contact with a pair of rotating flexible rubber disks 5 and 6 which grasp the shrimp, pulling it into the machine.

FIG. 2 is a left-side view of the interior mechanisms of the shrimp cutting machine of FIG. 1. Upon pulling the shrimp into the machine, the flexible disks 5 and 6 press the bottom of the shrimp against the surface of a rotating feed drum 7, thus supporting the shrimp on the bottom and also holding each shrimp in proper position so that a cutting disk 8 can cut the shrimp longitudinally down the center of the back.

The shrimp continues to follow the periphery of the feed drum 7 and is carried past a revolving pair of cutting disks 9 which cut the shell structure on each side of the center cut previously made by the single cutting disk 8. The shrimp is then ejected from the bottom of the machine.

A drive mechanism 11 comprising an electric motor 12 and a chain and sprocket mechanism 13 are used to drive the drum and disks. The placement of the drive mechanism 11, however, makes the Pinney machine extremely difficult, if not impossible, to keep in a clean and sanitary condition. As the shrimp is cut, the sand vein is stripped away, and flying debris and bodily fluids from the shrimp cover the inner workings of the machine. It must be frequently disassembled, cleaned and sanitized to keep the machine in sanitary working condition. Additionally, the use of a feed drum to support the shrimp places severe limitations on the degree of control which an operator is afforded during the cutting process. Shrimp vary considerably in size, and the mechanism in Pinney does not enable rapid adjustment of the cutting depth in accordance with the size and thickness of the shrimp.

Another existing shrimp deveining machine is shown in U.S. Pat. No. 5,290,199 to Morris. FIG. 3 is a frontal, left-side perspective view of the shrimp deveining machine in Morris. Morris discloses an improvement of the shrimp cutting machine in Pinney by creating a more sanitary machine 20 with a closed housing 21 for a motor and drive mechanism (not shown), and by mounting the cutting mechanism 22 externally and covering it with a protective shield 23. Morris, however, utilizes a polycarbonate idler roller 24 similar to the feed drum 7 (FIG. 1) in Pinney to support the bottom of the shrimp during the cutting process. The idler roller 24 freewheels on an adjusting shaft 25 which provides a limited capability to adjust the depth of the cut by rotating an adjusting knob 26 on the side of the housing 21. However, this adjustment is time consuming and cannot efficiently be performed dynamically as shrimp bodies of different sizes are fed through the machine.

It would be advantageous to have a shrimp deveining machine with the sanitation improvements of Morris and the capability to more precisely and dynamically control the depth of cut on each shrimp body as it passes through the machine. It is an object of the present invention to provide such a shrimp deveining machine.

SUMMARY OF THE INVENTION

In one aspect, the present invention is an apparatus for deveining shrimp. The apparatus comprises a housing, a motorized driving means mounted inside the housing, and a cutting mechanism mounted outside the housing. The cutting mechanism comprises a rotating cutting disk rotated by the motorized driving means, means for gripping and propelling shrimp past the rotating cutting disk, and means for dynamically adjusting the position of the shrimp in relation to the rotating cutting disk in order to provide cuts of uniform depth in shrimp of different sizes. The means for dynamically adjusting the position of the shrimp in relation to the rotating cutting disk includes a pair of diverging flexible disks separated at the outer edge by the approximate width of one shrimp body. The pair of diverging flexible disks is constructed of polyurethane of a thickness that enables the disks to bend a different amount for shrimp of different sizes, thereby dynamically adjusting the position of the shrimp in relation to the rotating cutting disk.

In another aspect, the present invention is an apparatus for cutting shrimp bodies having a front portion and a tail portion which comprises a plurality of tail sections. The apparatus comprises a housing, a motorized driving means mounted inside the housing, and a cutting mechanism mounted outside the housing. The cutting mechanism comprises a rotating cutting disk rotated by the motorized driving means, means for gripping and propelling the shrimp bodies past the rotating cutting disk, and means for positioning the shrimp bodies in relation to the rotating cutting disk to completely cut through the front portion while leaving at least one of the plurality of tail sections intact.

BRIEF DESCRIPTION OF THE DRAWING

The invention will be better understood and its numerous objects and advantages will become more apparent to those skilled in the art by reference to the following drawing, in conjunction with the accompanying specification, in which.

DETAILED DESCRIPTION

Figure 4:
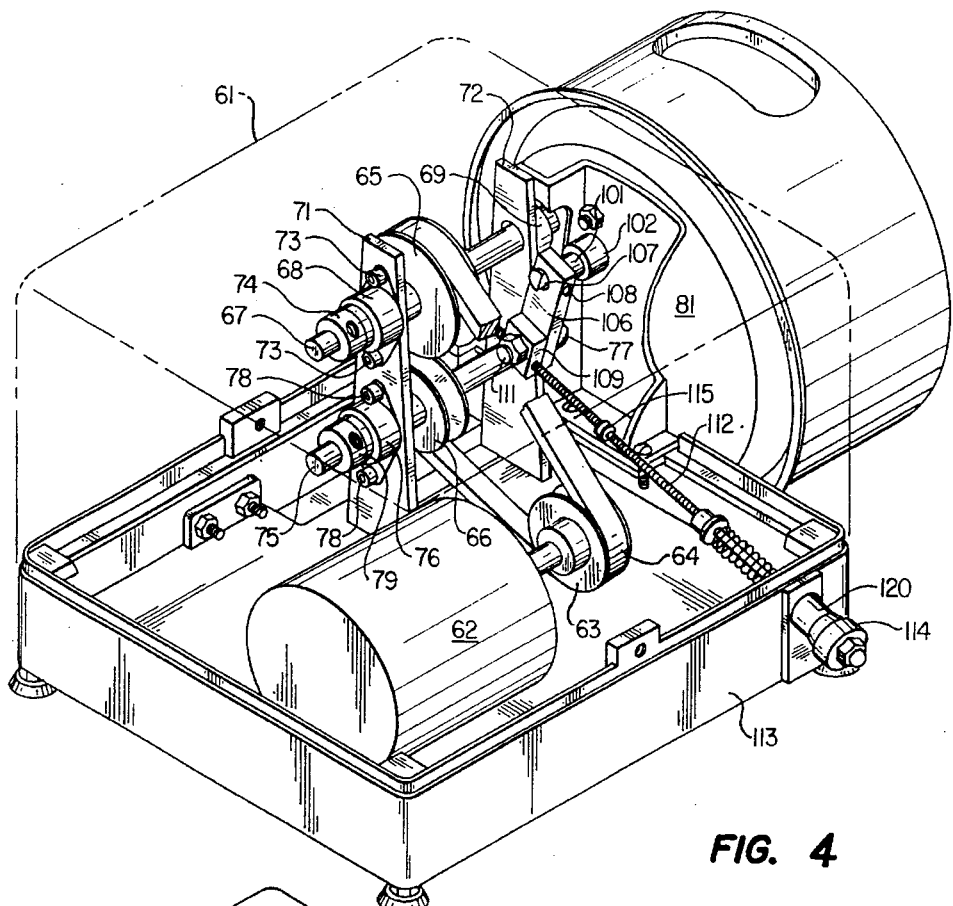
FIG. 4 is a frontal, left-side perspective view of the preferred embodiment of the shrimp deveining apparatus of the present invention showing an internal drive mechanism, and with a motor housing shown in phantom.

FIG. 4 is a frontal, left-side perspective view of the preferred embodiment of the shrimp deveining apparatus of the present invention showing an internal drive mechanism, and with a motor housing 61 shown in phantom. The housing 61 contains a drive mechanism which may comprise, for example, an electric motor 62, motor pulley 63, drive belt 64, upper pulley 65, and lower pulley 66. The upper pulley 65 is mounted on an upper shaft 67 which is supported by bearings 68 and 69. The bearings 68 and 69 are mounted to vertical struts 71 and 72 by screws 73. The upper shaft 67 is prevented from sliding along its longitudinal axis by a combination bushing and set screw 74.

The lower pulley 66 is mounted on a lower shaft 75 which is supported by bearings 76 and 77. The bearings 76 and 77 are mounted to vertical struts 71 and 72 directly below the upper shaft 67 by screws 78. The lower shaft 75 is prevented from sliding along its longitudinal axis by a combination bushing and set screw 79.

The upper shaft 67 and lower shaft 75 extend through apertures in a circular housing plate 81 mounted on the side of the housing 61. Elastomeric seals 82 and 83 provide a water-tight seal between the upper shaft 67 and the circular housing plate 81, and between the lower shaft 75 and the circular housing plate 81.

Figure 5:
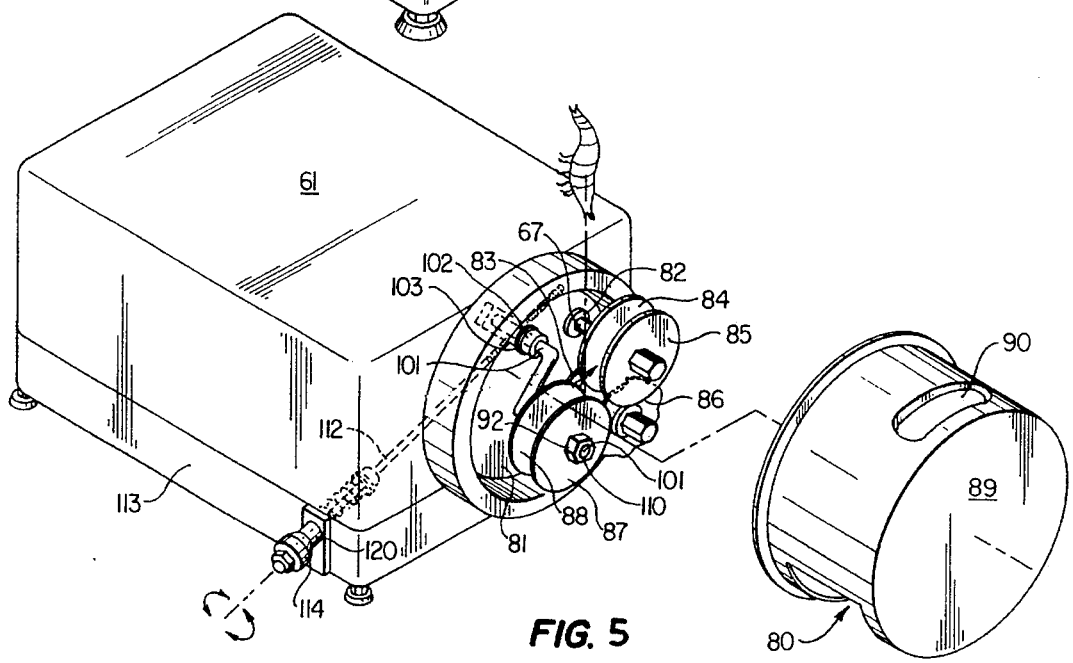
FIG. 5 is a frontal, right-side perspective view of the preferred embodiment of the shrimp deveining apparatus of the present invention showing a housing for an internal motor and drive mechanism, an external cutting mechanism, and with a protective shield removed.

FIG. 5 is a frontal, right-side perspective view of the preferred embodiment of the shrimp deveining apparatus of the present invention showing the housing 61 for the internal motor and drive mechanism, an external cutting mechanism, and with a protective shield removed. An upper pair of flexible disks 84 and 85 are mounted near the end of the upper shaft 67. The upper flexible disks 84 and 85 are constructed of an elastomeric material which may be, for example, a polyurethane formulation from Miles Corporation and molded into disks by Superior Plastics, Inc. of Fort Worth, Tex. A knurled insert (not shown) which may be, for example, rubber, fits tightly around the upper shaft 67. Each of the upper flexible disks 84 and 85 fits tightly around the knurled insert 91 and is caused thereby to rotate with the upper shaft 67. The main body of the upper disks has the proper degree of flexibility and rigidity to properly grasp and propel shrimp through the cutting mechanism. The upper disks may be constructed of polyurethane of a thickness of approximately 0.04 inches, and an inner section may be angled off of the vertical by approximately 8.0 degrees. An outer section of the upper disks may be angled off the vertical approximately 35 degrees.

Figure 6:
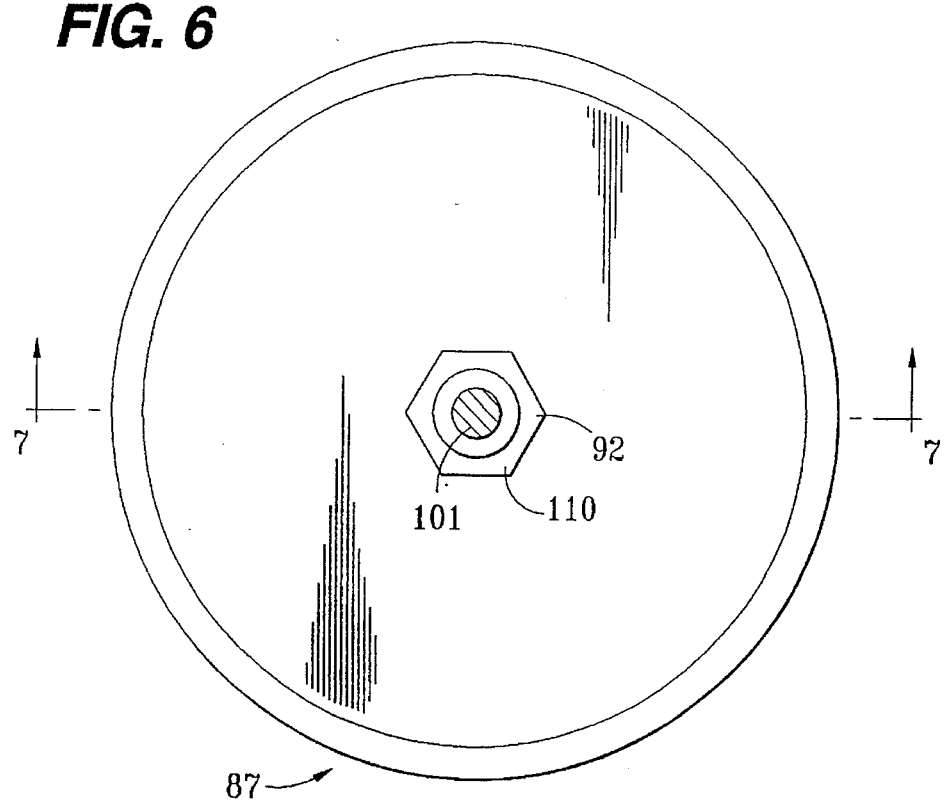
FIG. 6 is a right-side elevational view of a lower pair of flexible disks mounted on an adjusting shaft in the preferred embodiment of the present invention.

FIG. 6 is a right-side elevational view of the lower flexible disks 87 and 88 mounted on the adjusting shaft 101 in the preferred embodiment of the present invention. The lower flexible disks are also preferably constructed of the polyurethane formulation from Miles Corporation and molded into disks by Superior Plastics, Inc. of Fort Worth, Tex. The lower flexible disks are mounted on a hexagonal metal frame 92 which freewheels on a small plastic sleeve bearing 110 mounted on the adjusting shaft 101.

Figure 7:
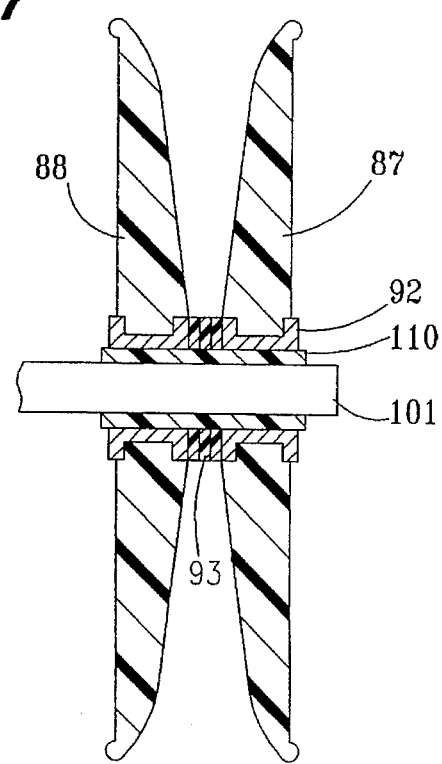
FIG. 7 is a cross sectional view of the lower pair of flexible disks, taken along the line 7—7 of FIG. 6.

FIG. 7 is a cross sectional view of the lower flexible disks 87 and 88, taken along the line 7—7 of FIG. 6. The lower disks may be constructed of polyurethane which at its point of maximum thickness is approximately 0.25 inches. The curvature of the interior surfaces of the lower disks creates a divergent region between the disks which is suitable for the placement of shrimp. The main body of the lower disks has the proper degree of flexibility and rigidity to properly grasp shrimp bodies and prevent their longitudinal rotation as they pass through the cutting mechanism. The flexibility of the lower disks also causes the disks to diverge farther apart when shrimp bodies of greater diameter are placed between the disks. Plastic spacer washers 93 may be placed on the adjusting shaft 101 between the lower flexible disks 87 and 88 to adjust the size of the region between the disks to accommodate different sizes of shrimp.

Referring again to FIG. 4, the drive belt 64 from the motor 62 engages pulleys 65 and 66 mounted on the upper and lower parallel shafts, respectfully. The pulley 65, mounted on the upper shaft 67, has a larger diameter than pulley 66, mounted on the lower shaft 75. Therefore, for a given motor speed, the upper shaft 67, which has the upper flexible disks 84 and 85 mounted on the outside end thereof, rotates at a lower RPM than the lower shaft 75, which has the cutting disk 86 mounted near the outside end thereof. Thus, the cutting disk 86 turns at a higher rate of rotation than the upper flexible disks 84 and 85 mounted thereabove. Thus when the upper flexible disks 84 and 85 pull the shrimp downward into contact with the cutting disk 86, the edge of the cutting disk 86 is moving downward at a higher rate of speed than the shrimp, and therefore, makes a clean cut in the back of the shrimp.

Motor pulley 63 may have a diameter of approximately 1½ inches while the diameter of the upper pulley 65 may be approximately 3 inches. This ratio optimizes the motor speed in order to reduce the speed of the drive belt 64 and increase torque on the upper pulley 65 and lower pulley 66. The lower belt speed reduces noise, reduces heat in the motor housing 61, and causes less wear and tear on machine parts than previous shrimp cutting machines. Additionally, the increased torque provides improved capability to grip shrimp bodies with the upper flexible disks 84 and 85.

An adjusting shaft 101 extends through an aperture in the circular housing plate 81, where it is journalled by a bearing 102. In FIG. 5, it can be seen that an elastomeric seal 103 provides a water-tight seal between the bearing 102 and its journal, thereby completely preventing any debris from the shrimp-cutting operation from entering the motor housing 61.

Still referring to FIG. 5, it can be seen that the exterior portion of the adjusting shaft 101 has two equal-but-opposite bends in it to form a parallel portion which is offset from the axis of rotation of the adjusting shaft 101.

As noted above, the lower pair of flexible disks 87 and 88 is mounted near the external end of the adjusting shaft 101. In the preferred embodiment, the lower flexible disks 87 and 88 freewheel on a small plastic sleeve bearing 110 and support the shrimp bodies from the underside as they pass through the cutting mechanism. Compared to hard drums or idler rollers utilized in existing shrimp cutting machines, the use of the lower flexible disks 87 and 88, in combination with the upper flexible disks 84 and 85 pulling the shrimp from above, provides greatly improved control and accuracy of the cut when different sizes of shrimp are fed through the machine. For example, when utilizing the prior art rubber idler roller to support the bottom of the shrimp bodies, smaller shrimp often rotate along their longitudinal axes as they pass through the cutting mechanism, and the cut misses the sand vein. The lower pair of flexible disks 87 and 88 prevent this undesirable rotation.

By way of additional example, an operator often has a batch of shrimp to devein which are all categorized as, for example, medium sized shrimp. However, there is variation of the size of the shrimp within this category. It is still desirable, however, to cut the shrimp to the same depth as measured from the back or upper side of the shrimp bodies. The lower flexible disks automatically and dynamically adjust for shrimp bodies of slightly varying size and provide for uniform cuts of near equal depth on each shrimp. Larger sized bodies contact the flexible disks at a point farther from the center of the disks than do smaller sized shrimp. The disks are more flexible farther from the center, and as a result, the disks are spread farther apart by the larger sized shrimp bodies. This causes the larger shrimp to decend a greater distance toward the center of the disks than smaller shrimp. The result is a cut of near equal depth on the back side of shrimp of different sizes.

Figure 1:
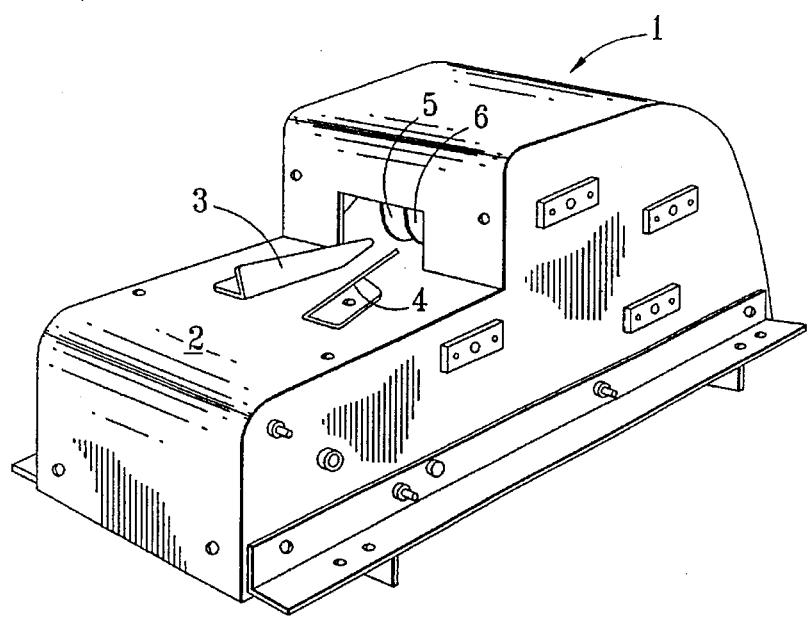
FIG. 1 (Prior art) is a frontal, right-side perspective view of an existing shrimp cutting machine.
Figure 2:
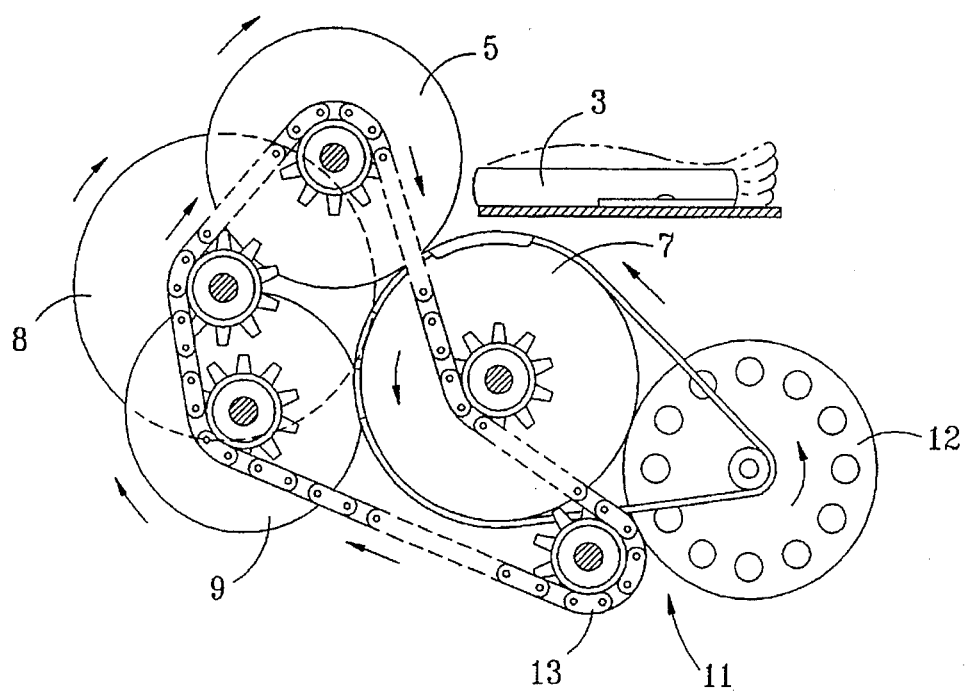
FIG. 2 (Prior art) is a left side view of the interior mechanisms of the shrimp cutting machine of FIG. 1.
Figure 3:
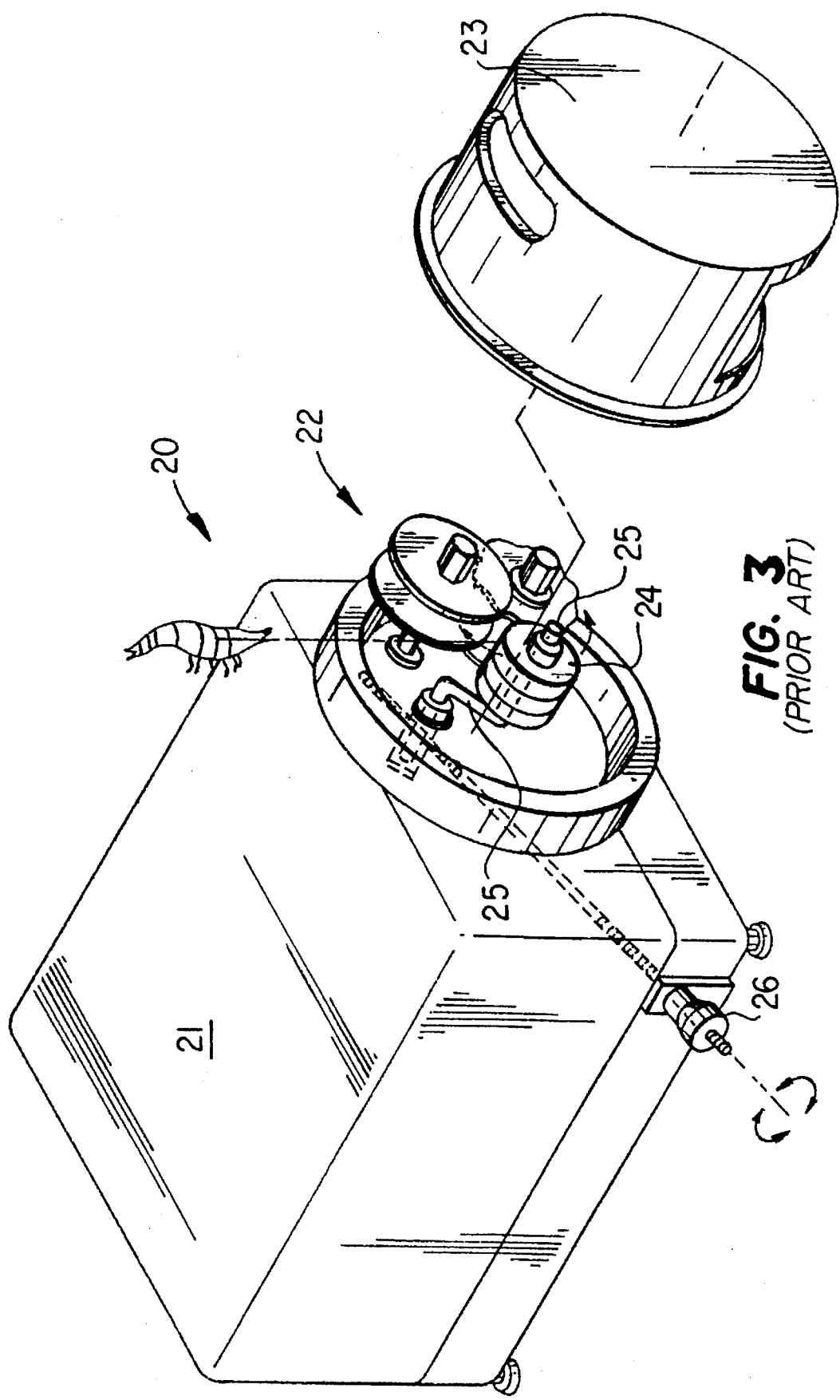
FIG. 3 (Prior art) is a frontal, right-side perspective view of a second existing shrimp deveining machine with a housing for an internal motor and drive mechanism, an external cutting mechanism, and with a protective shield removed.

The flexibility of the lower flexible disks 87 and 88 also reduces stress on the upper flexible disks 84 and 85 which, in existing shrimp deveining machines, was caused by the hard idler roller 24 (FIG. 3). The result is improved wear and longer life of the upper flexible disks.

By way of additional example, the precision of the cut which is attainable with the present invention enables the operator to adjust the depth of the cut so that the front portion of the shrimp is cut all the way through while leaving the last few sections next to the tail intact. The lower flexible disks 87 and 88 hold the front portion farther from the center of the disks because of the larger diameter of that portion of the shrimp body. The narrower sections of the tail portion fall between the lower flexible disks, closer to the center, where the cutting disk 86 does not reach. In this way, shrimp such as rock shrimp are "butterflied" as a means of preparation for cooking. Of course, by adjusting the cutting depth to its maximum depth, the machine cuts the shrimp into two pieces rather than deveining or butterflying the shrimp.

The mechanism for adjusting the depth of cut is shown in FIG. 4. It can be seen that one end of a lever arm 106 is mounted to a flattened interior end 107 of the adjusting shaft 101 with a set screw 108 which causes the lever arm to rotate with the adjusting shaft 101. At the other end of the lever arm 106, a block 109 is mounted with a bolt 111. The block 109 is free to rotate about the bolt 111. The block is threadably mounted to an adjusting rod 112 which extends diagonally through the motor housing 61 and exits through a flexible support 120 mounted in an aperture in the front side 113 of the motor housing 61. An adjusting knob 114 is mounted on the exterior end of the adjusting rod 112, and is used to rotate the adjusting rod. Rotation of the adjusting rod 112 causes the block 109 to translate along the adjusting rod, thereby rotating the lever arm 106 through an arcuate distance. The range of motion of the block 109 along the adjusting rod 112 is limited in each direction by adjustable stop-collars 115.

Rotation of the lever arm 106, in turn, causes rotation of the adjusting shaft 101 as it passes through bearing 102. As seen in FIG. 5, rotation of the adjusting shaft 101 sweeps the external portion of the shaft through an arcuate change of position, thereby moving the lower flexible disks 87 and 88 closer to or farther away from the cutting disk 86. In this manner, the depth of cut made on the shrimp may be adjusted, while simultaneously preventing debris from the cutting operation from entering the motor housing 61. A stop collar (not shown) at the interior end of the adjusting rod 112 (FIG. 4) prevents the operator from adjusting the lower flexible disks 87 and 88 to the point that the cutting disk 86 contacts the spacer washers 94.

Still referring to FIG. 5, a protective shield 89 may be slidably engaged over the circular housing plate 81 for safety protection from the cutting disk 86. The shield 89 also serves to retain flying debris which is created by the high speed cutting disk 86 as it cuts the vein from the shrimp.

In operation, shrimp are manually fed into the apparatus 60 through the small opening 90 in the top of the protective shield 89, between the upper flexible disks 84 and 85 and the lower flexible disks 87 and 88. The shrimp are placed head first into the apparatus with the upper or backside being engaged by the upper flexible disks 84 and 85 and the lower or from side of the shrimp being held by the lower flexible disks 87 and 88. The upper flexible disks 84 and 85 spread under pressure so as to grip various-sized shrimp as they enter the apparatus. The shrimp are quickly drawn through the apparatus by the rotating flexible disks 84 and 85 which are rotated at high speed by the electric motor 62. The lower flexible disks 87 and 88 spread to dynamically adjust the cutting depth for variations in the size of the shrimp bodies while the rotating cutting disk 86 cuts the vein from the shrimp. The deveined shrimp bodies then fall through a large opening 80 in the bottom of the shield 89 into a holding container (not shown).

Thus, there has been described and illustrated herein, the preferred embodiment of an improved shrimp deveining apparatus. However, those skilled in the art will recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. In a shrimp deveining machine of the type having a housing, a motor within said housing means external to said housing for gripping and propelling said shrimp, means external to said housing and adjacent said gripping and propelling means for cutting the sand vein from said shrimp, and means for adjusting the position of said cutting means in relation to said gripping and propelling means, the improvement comprising:

a pair of flexible disks for dynamically and automatically adjusting the position of said shrimp in relation to said cutting means, without manual intervention, in order to provide a uniform depth of cut for shrimp of different sizes, said flexible disks being adjustably positioned relative to said gripping and propelling means.

2. The shrimp deveining machine of claim 1 wherein said pair of flexible disks is mounted on an adjusting shaft.

3. The shrimp deveining machine of claim 2 wherein said adjusting shaft is a rotating adjusting shaft having two equal-but-opposite bends which create a portion of said adjusting shaft which is parallel to, and offset from the axis of rotation of said adjusting shaft.

4. The shrimp deveining machine of claim 3 wherein said pair of flexible disks is mounted on said offset parallel portion of said adjusting shaft.

5. The shrimp deveining machine of claim 1 wherein said pair of flexible disks is constructed of polyurethane.

6. An apparatus for deveining a shrimp body having a back side and a front side, said apparatus comprising:

a housing;

a motorized driving means mounted inside said housing; and a cutting mechanism mounted outside said housing, said cutting mechanism comprising:

a rotating cutting disk rotated by said motorized driving means;

means for gripping and propelling said shrimp body past said rotating cutting disk; and flexible means for dynamically and automatically adjusting the position of said shrimp body in relation to said rotating cutting disk without manual intervention, in order to provide cuts of uniform depth in the back side of shrimp bodies of different sizes, said flexible means being adjustably positioned relative to said gripping and propelling means.

7. The apparatus for deveining shrimp bodies of claim 6 wherein said means for dynamically adjusting the position of said shrimp body in relation to said rotating cutting disk includes a lower pair of diverging flexible disks separated by the approximate width of one shrimp body, said lower flexible disks grasping said shrimp body from the front side.

8. The apparatus for deveining shrimp bodies of claim 7 wherein said means for gripping and propelling said shrimp body past said rotating cutting disk includes an upper pair of diverging flexible disks separated by the approximate width of one shrimp body, said upper flexible disks grasping said shrimp body from the back side.

9. The apparatus for deveining shrimp of claim 8 wherein said upper pair and said lower pair of diverging flexible disks are constructed of polyurethane.

10. The apparatus for deveining shrimp of claim 9 wherein said lower pair of polyurethane diverging flexible disks has a maximum thickness that enables said lower pair of polyurethane diverging flexible disks to bend a different amount for shrimp bodies of different sizes.

11. The apparatus for deveining shrimp of claim 10 wherein each of said lower pair of polyurethane diverging flexible disks has a maximum thickness of approximately 0.25 inches.

12. The apparatus for deveining shrimp of claim 11 wherein said motorized driving means includes:

a motor having a rotating drive shaft;

a motor pulley mounted on said drive shaft;

an upper shaft extending through a side of said housing;

an upper pulley mounted on said upper shaft inside said housing; and a drive belt which transfers rotational movement of said motor pulley to said upper pulley.

13. The apparatus for deveining shrimp of claim 12 wherein said upper pulley has a diameter approximately twice as large as the diameter of said motor pulley.

14. The apparatus for deveining shrimp of claim 6 wherein said motorized driving means includes:

a motor having a rotating drive shaft;

a motor pulley mounted on said drive shaft;

an upper shaft extending through a side of said housing;

an upper pulley mounted on said upper shaft inside said housing; and a drive belt which transfers rotational movement of said motor pulley to said upper pulley.

15. The apparatus for deveining shrimp of claim 14 wherein said upper pulley has a diameter approximately twice as large as the diameter of said motor pulley.

16. An apparatus for cutting a shrimp body having a front portion and a tail portion, said tail portion comprising a plurality of tail sections, said apparatus comprising:

a housing;

a motorized driving means mounted inside said housing; and a cutting mechanism mounted outside said housing, said cutting mechanism comprising:

a rotating cutting disk rotated by said motorized driving means;

means for gripping and propelling said shrimp body past said rotating cutting disk; and flexible means for positioning said shrimp body in relation to said rotating cutting disk to completely cut through said front portion while leaving at least one of said plurality of tail sections intact, said flexible means being adjustably positioned relative to said gripping and propelling means.

17. The apparatus for cutting a shrimp body of claim 16 wherein said means for positioning said shrimp body in relation to said rotating cutting disk includes a pair of diverging flexible disks separated by the approximate width of one shrimp body.

18. The apparatus for cutting a shrimp body of claim 17 wherein said pair of diverging flexible disks is constructed of polyurethane.

* * * * *